Dec. 23, 1941.  H. P. ELLIOTT  2,267,195
MACHINE FOR APPLYING LABELS TO ARTICLES
Filed March 15, 1939   7 Sheets-Sheet 1
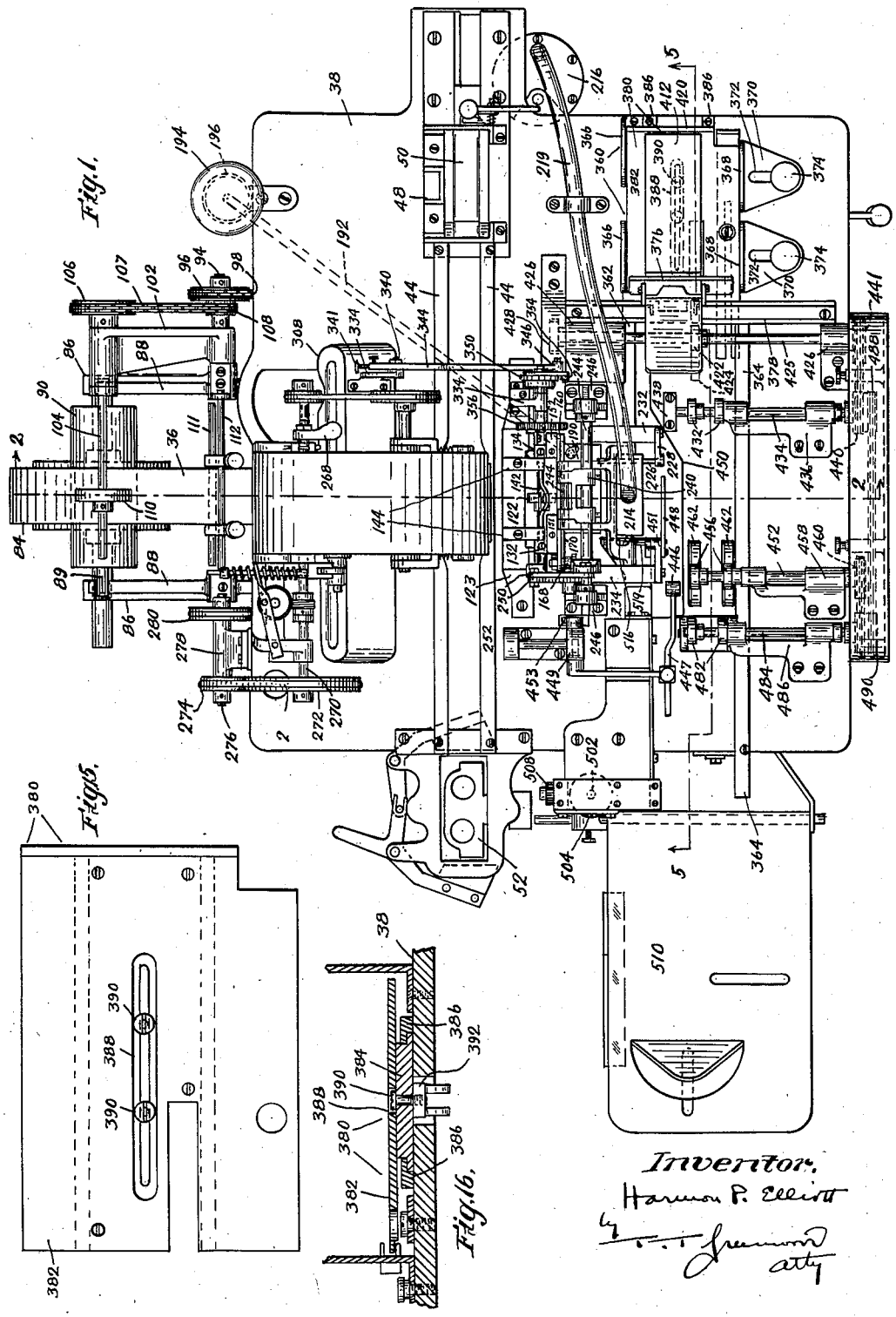
Inventor.
Harmon P. Elliott
by
          atty Dec. 23, 1941.                H. P. ELLIOTT                2,267,195
                    MACHINE FOR APPLYING LABELS TO ARTICLES
                        Filed March 15, 1939          7 Sheets-Sheet 2
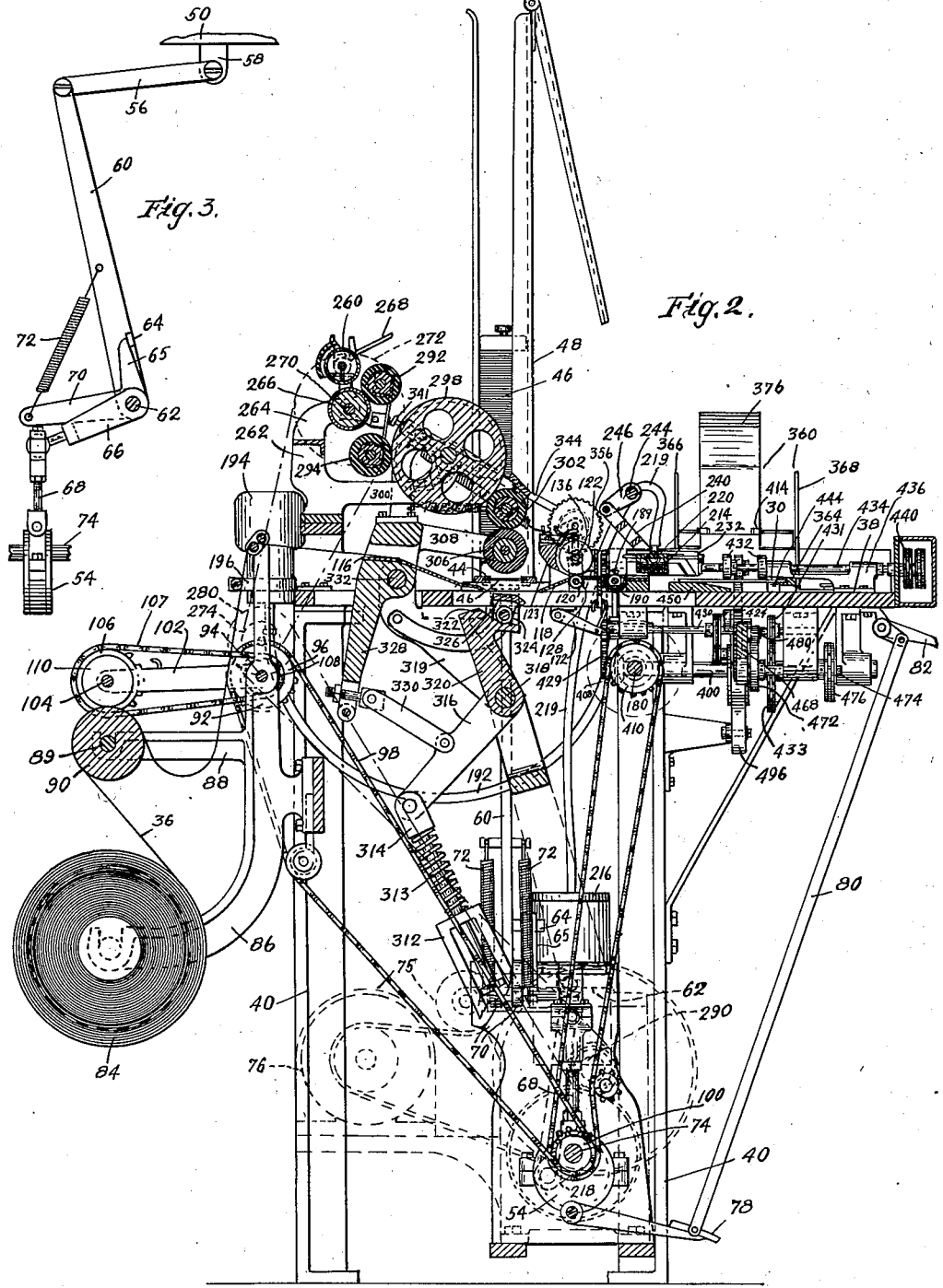
Inventor,
Harmon P. Elliott

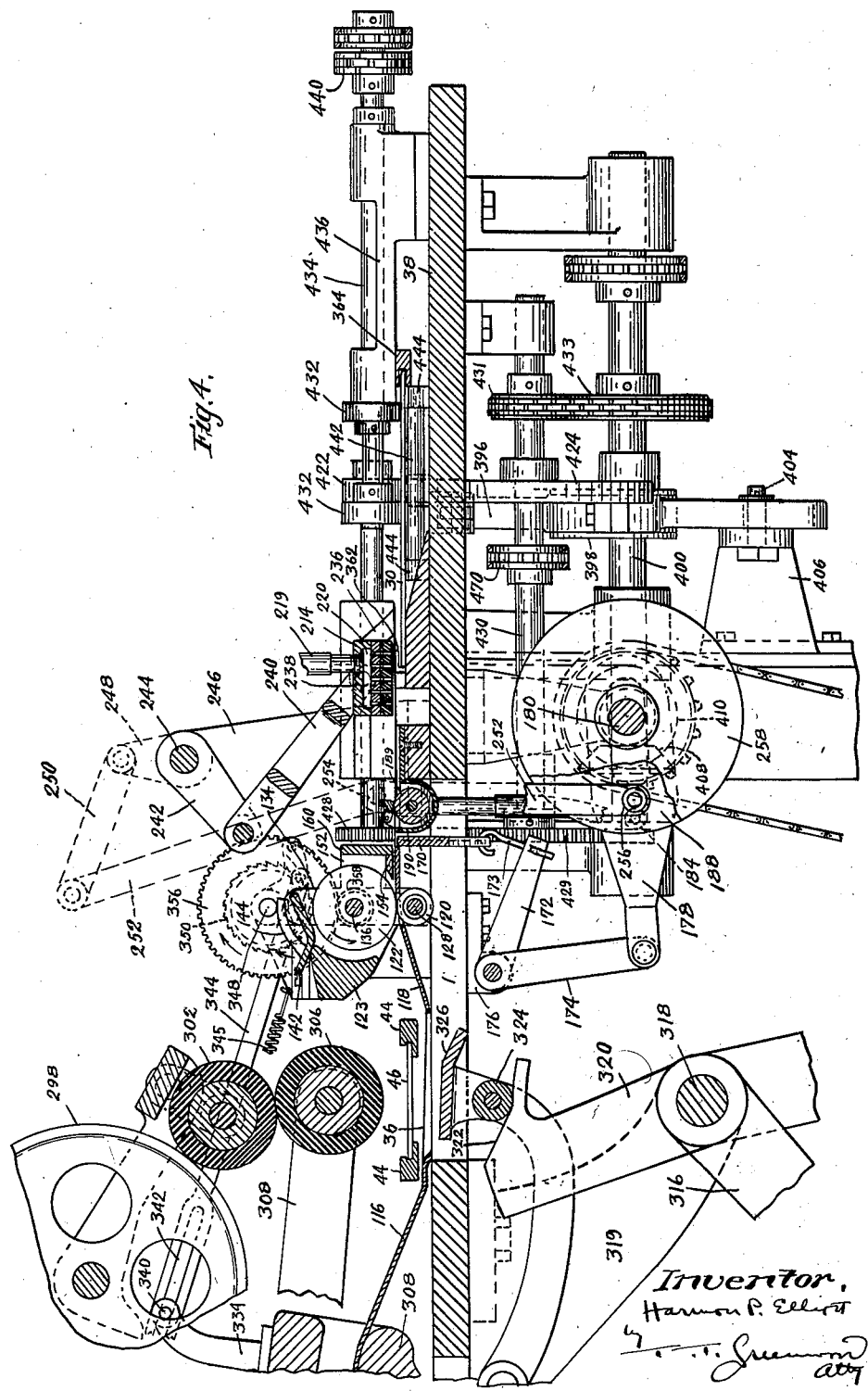

Dec. 23, 1941.  H. P. ELLIOTT  2,267,195
MACHINE FOR APPLYING LABELS TO ARTICLES
Filed March 15, 1939　　7 Sheets-Sheet 4
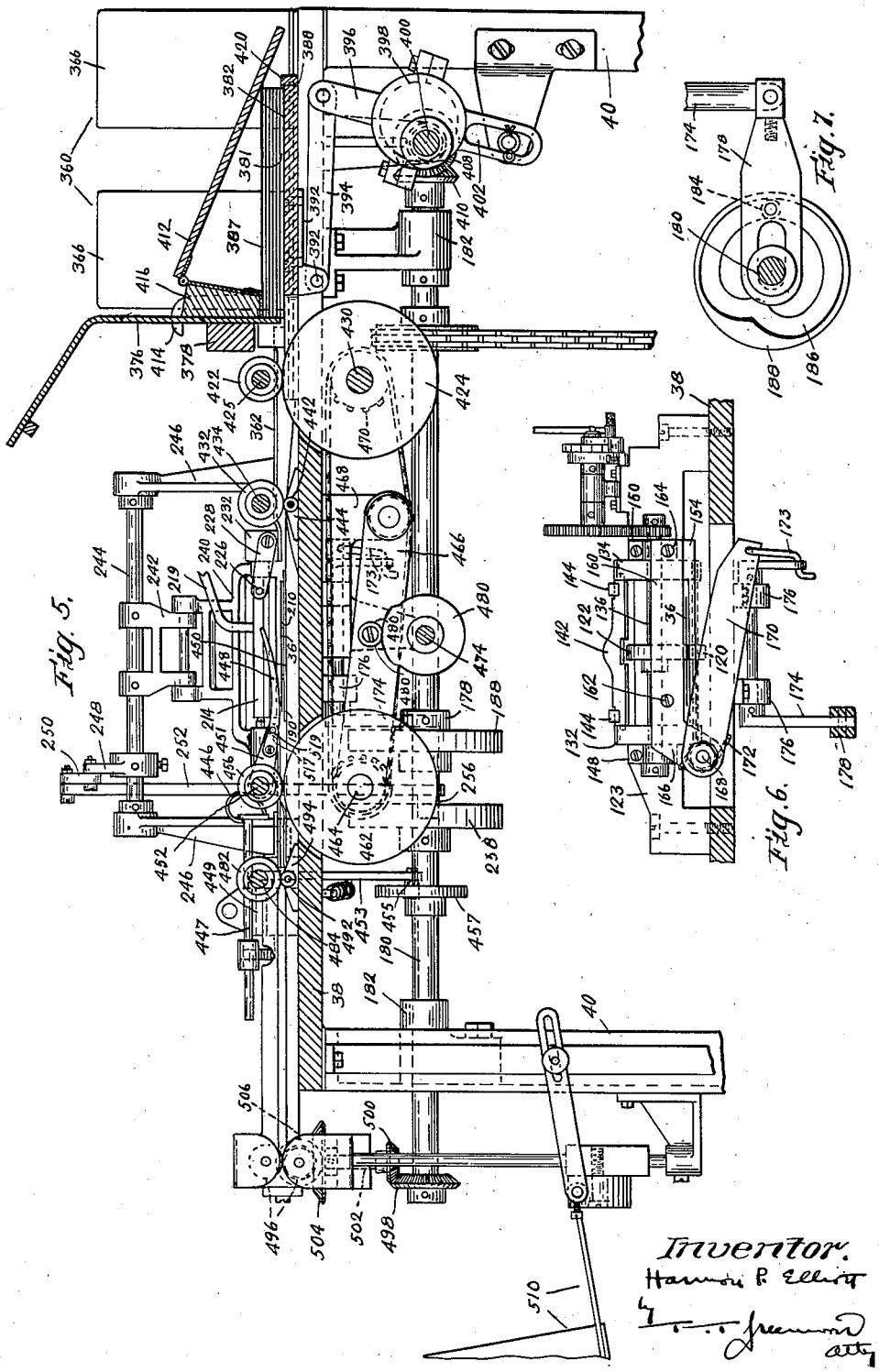
Inventor.
Harmon P. Elliott

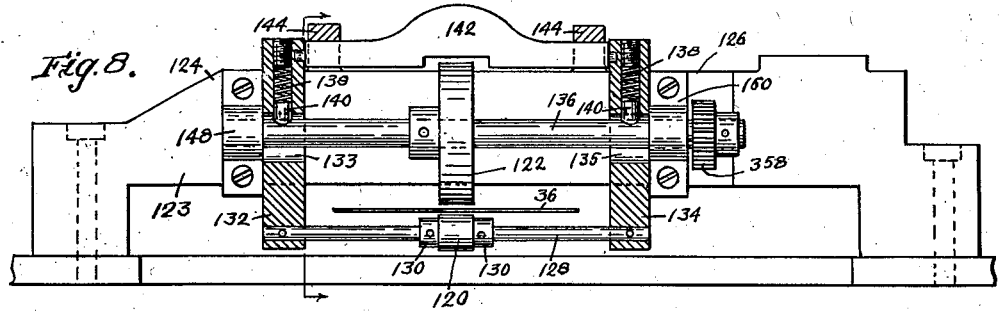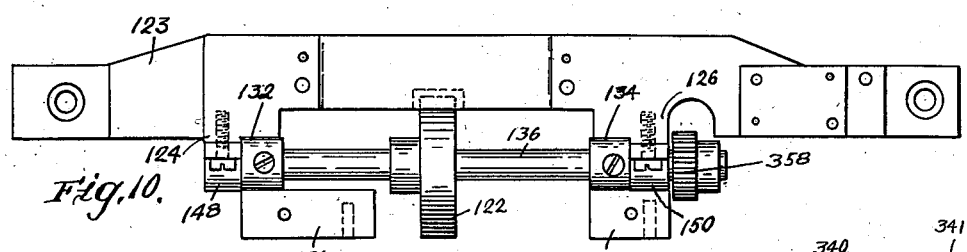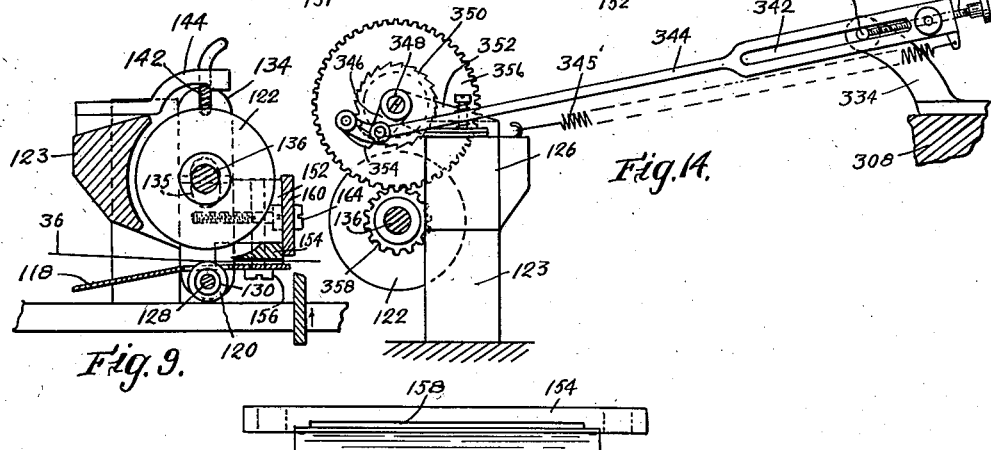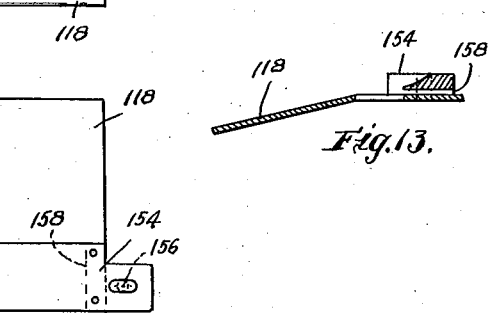

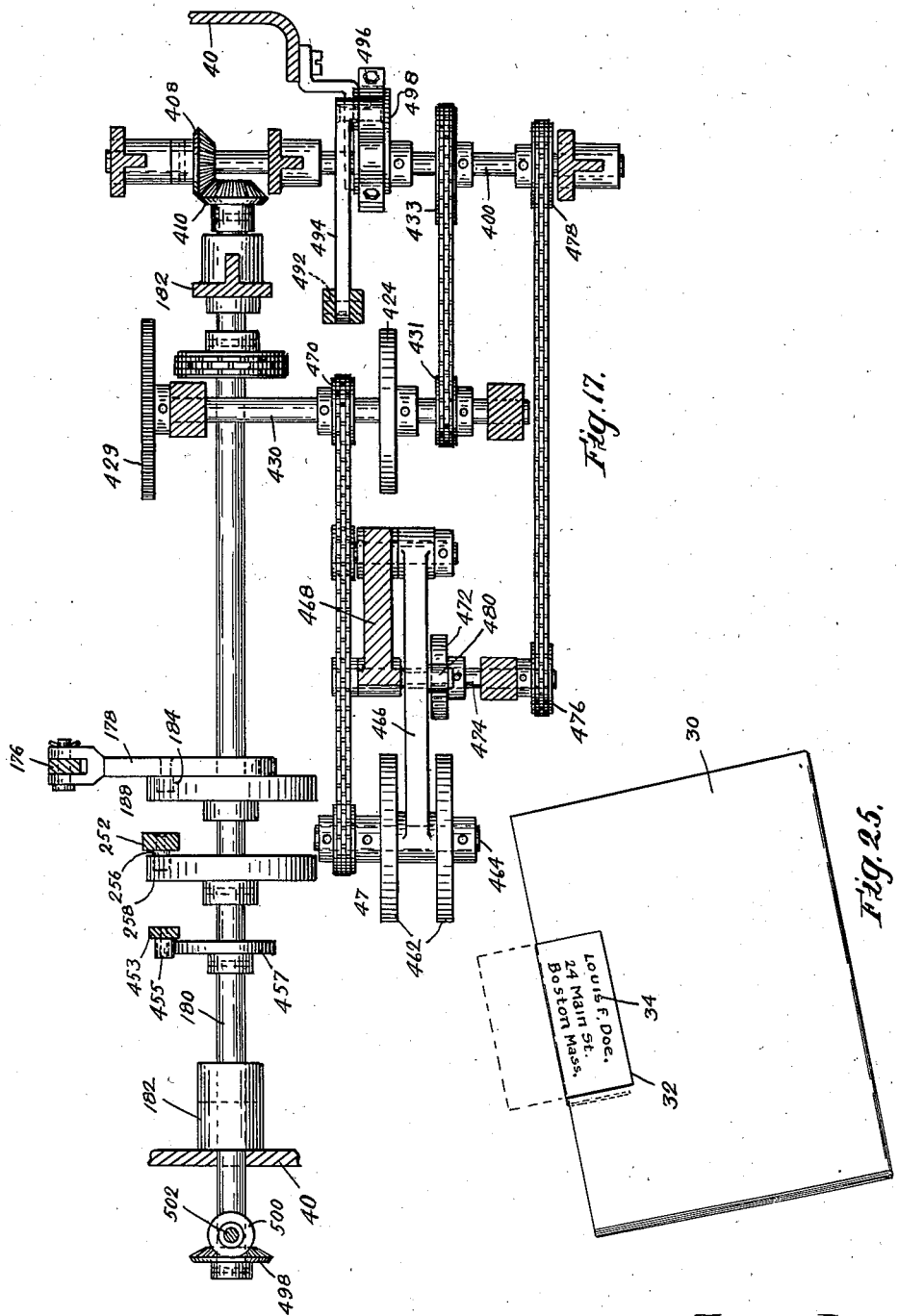

Dec. 23, 1941.  H. P. ELLIOTT  2,267,195
MACHINE FOR APPLYING LABELS TO ARTICLES
Filed March 15, 1939  7 Sheets-Sheet 7
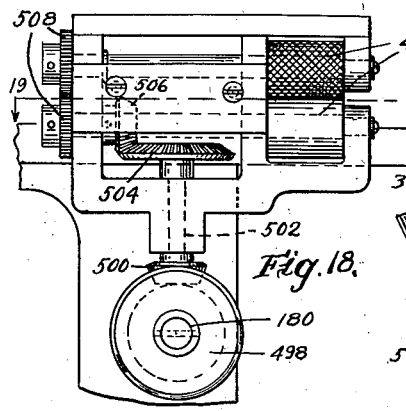
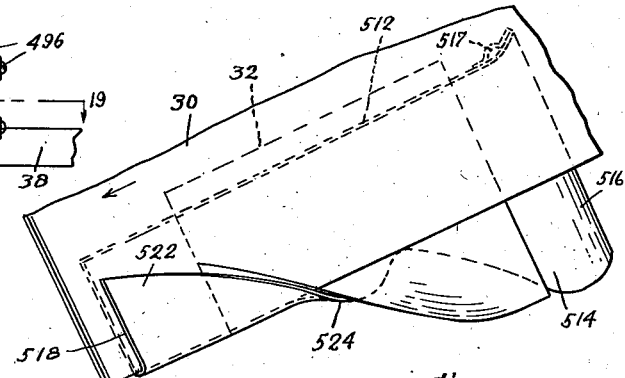
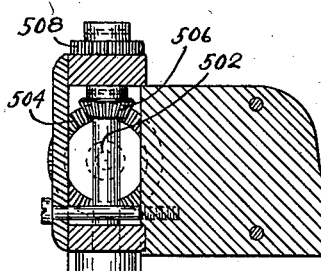
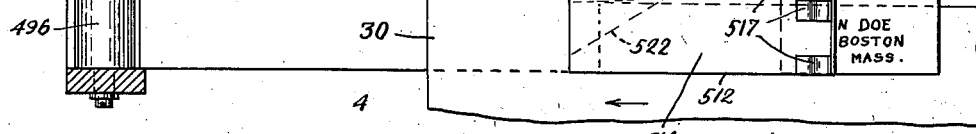
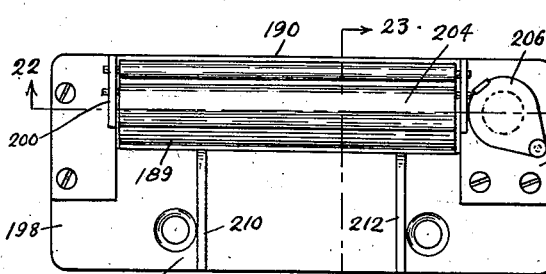
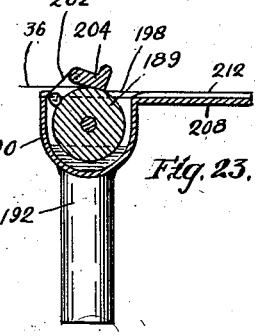
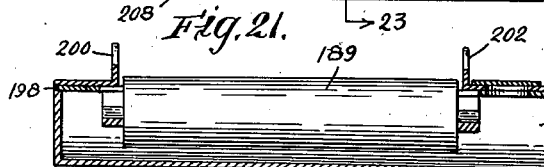
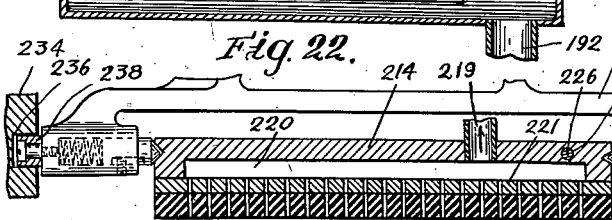
Inventor.
Harmon P. Elliott
by
atty Patented Dec. 23, 1941

2,267,195

UNITED STATES PATENT OFFICE 2,267,195

MACHINE FOR APPLYING LABELS TO ARTICLES

Harmon P. Elliott, Watertown, Mass.

Application March 15, 1939, Serial No. 261,996

8 Claims. (Cl. 216—30)

The present invention relates to addressing machines and, as illustrated herein, has particular reference to machines for automatically applying addresses to articles of the type having a folded edge and an opposed open edge.

It has been proposed to advance articles such as magazines, broadsides, booklets, advertising circulars, and the like in successive order from a stack to a position where addresses are applied. In machines of this type, the addresses are usually applied directly to the article. This method of applying addresses has been satisfactory in most instances since it materially reduces the cost of applying addresses to such articles as compared with the cost of manually applying addresses. In some instances, however, it was found desirable, or advisable, to seal the open edges of such articles to prevent the articles from being torn or otherwise damaged during mailing. This necessitated the application of a seal to the open edge of the article. This ordinarily was performed manually and greatly increased the cost of preparing such articles for mailing.

An object of the present invention is to provide a machine for addressing and sealing such articles without the necessity of resorting to manual means for performing any of the addressing or sealing operations. A machine operating in this manner eliminates the necessity for manual sealing and, consequently, not only speeds up production, thereby effecting material savings, but also performs these operations more satisfactorily than is possible with prior machines or methods.

Another object of the present invention is to provide an addressing machine for applying address labels to a succession of articles and for folding the labels about the open edge of the articles as the articles pass through the machine.

Still another object of the present invention is to provide improved means for supporting and feeding articles automatically from a vertical stack and for addressing and sealing them.

Another object of the invention is to provide an addressing machine arranged to apply addresses successively to a web of paper to sever the addressed labels from the web, and to apply and fold the severed labels automatically to a succession of articles.

A yet further object of the invention is generally to improve upon addressing methods and the construction and operation of addressing machines.

With the above and other objects and features in view, the invention will be described with reference to the accompanying drawings in which:

Fig. 1 is a plan view of a machine illustrating one embodiment of the present invention;

Fig. 2 is a vertical sectional view taken along line 2—2 of Fig. 1;

Fig. 3 is a view in front elevation of the machine for operating the stencil feed;

Fig. 4 is a sectional view similar to Fig. 2 but showing a portion of the mechanism on an enlarged scale;

Fig. 5 is a sectional view taken along line 5—5 of Fig. 1;

Fig. 6 is a view in front elevation of the paper web feeding and severing mechanism;

Fig. 7 is a detailed view showing the severing knife cam;

Fig. 8 is a view in front elevation, partly in section, illustrating the construction of the bearing for the label feed idler roll;

Fig. 9 is a sectional view of the paper web feeding mechanism;

Fig. 10 is a plan view of the bridge member for supporting the paper web feed mechanism;

Fig. 11 is a view in front elevation of a paper guide member located below the paper web feed;

Fig. 12 is a plan view of the paper guide shown in Fig. 11;

Fig. 13 is a sectional view taken along the line 13—13 of Fig. 12;

Fig. 14 is a view in side elevation of the paper web feed operating mechanism;

Fig. 15 is a plan view of the article pusher plate;

Fig. 16 is a transverse sectional view of the article pusher plate;

Fig. 17 is a bottom plan view of the mechanism showing the arrangement of shaft and the drive connection;

Fig. 18 is a detailed view in side elevation of the squeeze roll;

Fig. 19 is a sectional view taken along line 19—19 of Fig. 18;

Fig. 20 is a bottom plan view of the folder for folding the label about the open edge of an article;

Fig. 21 is a plan view of moistening mechanism for the paper web;

Fig. 22 is a sectional view of the moistening mechanism taken along line 22—22 of Fig. 21;

Fig. 23 is a sectional view of the mechanism taken along line 23—23 of Fig. 21;

Fig. 24 is a vertical sectional view of the suction pad for feeding the labels into applying position, and Fig. 25 is a perspective view of an article addressed and sealed by the illustrated machine.

The machine as illustrated herein is arranged to address and apply labels to magazines, booklets, advertising circulars, or the like.

As herein shown in Fig. 25, an advertising circular 30, folded transversely of its length, has a label 32 bearing an address 34 applied to approximately the middle of the opposite open edge and is turned over said edge to seal the circular and attach together the free ends of the leaves and to prevent it from being torn or otherwise damaged during mailing. The address 34 is shown as applied to a continuous web of paper 36 which is fed past a printing station but it is apparent that the address 34 could be printed on separate labels, if so desired or that the web could be pre-addressed.

The paper web 36, may, as illustrated, be provided with an adhesive coating, such as glue, which may be moistened to render the coating tacky or adhesive or the paper may be uncoated and the adhesive applied to the paper shortly before it is applied to the circular or other article.

The illustrated machine is provided with a bed or table 38 which is supported upon a suitable frame 40. The bed 38 is provided with parallel spaced rails 44. Between these rails, address bearing printing devices, herein illustrated as stencils 46, are advanced in succession from a stencil holder 48 located at the right hand end of the track by a reciprocating pusher 50. The printing devices or stencils 46 pass from the track and are delivered into a stencil receiver 52 located at the other end of the table or bed 38. As is usual in machines of this type, the pusher 50 is reciprocated by suitable connections to an eccentric 54, Figs. 2 and 3. These connections include a link 56 pivotally secured at one end to a depending lug 58 secured to, or formed as a part of, the pusher 50. The other end of the link 56 is pivotally secured to the upper end of a second link 60 the lower end of which is rotatably mounted on a shaft 62 mounted in suitable supports in the machine frame 40. The link 60, adjacent to its lower end, is provided with a forwardly extending boss 65 which engages an upstanding arm 65 of a bell crank lever 66 which is also rotatably mounted on the shaft 62. The other arm of the bell crank lever is pivotally connected to the upper end of an eccentric strap 68, the lower end of which surrounds the eccentric 54. A pair of arms 70, located at opposite sides of the link 60, are rigidly secured to the shaft 62. The free ends of the arms 70 are connected to the link 60 by means of springs 72 which operate to urge the arm 60 in a counter-clockwise direction to move the pusher 50 connected thereto to the right to feed stencils from the holder 48 through a printing mechanism to the stencil receiver 52. The pushed 50 is moved to the left by the bell crank lever 66 which is oscillated by rotation of the eccentric 54. It is apparent that the pusher 50, because it is spring urged in its feeding movement, prevents damage to the stencils in the event that the stencils were prevented from moving from the holder 48.

The eccentric 54 is mounted on a shaft 74 which is part of a power plate 75 well known in the art, the shaft being driven by an electric motor 76 or other suitable prime mover through a one revolution clutch of any suitable design not herein specifically shown. As shown in Fig. 2, the machine is provided with a treadle 78 for operating the clutch, which pedal may, as illustrated, be provided with an upwardly extending rod 80 connected to a suitable hand piece 82 for controlling the operation of the machine by the hand of the operator as well as by the foot treadle 78.

The illustrated machine is provided with paper web feeding and severing mechanism. As most clearly shown in Fig. 2, a roll of paper 84 is mounted in suitable brackets 86 fixed to the frame 40 by machine screws or other suitable means. The bracket 86 is also provided with rearwardly extending arms 88 having suitable bearings to receive a shaft 89 on which is mounted an idler roll 90 over which the paper web is fed from the roll 84. The bracket 86 is provided with an upwardly extending portion 92 in which a shaft 94 is journalled, said shaft at one end carries a sprocket 96 driven through a chain 98 from a sprocket 100 secured to the power shaft 74. A rearwardly extending bracket member 102 is loosely mounted on the shaft 94. A shaft 104 is journalled in the rear end of said bracket member and has a sprocket 106 fixed to one end thereof, and driven by a chain 107 which passes about a sprocket 108 secured to the shaft 94. The other end of the shaft 104 carries a knurled feed roll 110 which overlies and peripherally engages the paper web on the roll 90 by the weight of the bracket and is arranged to be rotated in a counter-clockwise direction as viewed in Fig. 2 to feed the paper from the roll 84.

It is to be noted that the rearwardly extending bracket 102 and its associated mechanism may be swung upwardly away from the roll 90 to interrupt feeding of the paper web when so desired.

It is to be noted that the web-feeding mechanism just described operates in a continuous manner to feed the paper web into a loose loop from which the paper is withdrawn in an intermittent manner by mechanism presently to be described.

As shown most clearly in Fig. 2, the paper web passes from between the rolls 90, 110 to and between a pair of stationary tensioning and curl-removing bars 111, 112 which are adjustably mounted in the upper end of the extension 92 transversely of the web for the purpose of varying the tension on the web by means not herein important. The paper web passes from between the bars 111, 112 over a guide plate 116 which extends downwardly and forwardly and is secured at its forward end to the bed 38 of the machine. The web then passes below the stencil guideway and a stencil 46 which is in printing position therein. After the web has been printed with the address borne by the stencil by means of suitable printing mechanism which will later be described, it passes over a second guide plate 118, secured to the bed of the machine, and between a pair of feed rolls 120 and 122 which are mounted on a bridge member 123 secured to the bed 38 of the machine by set screws or other suitable fastenings.

Referring now to Figs. 6, 9, and 10, it will be noted that feed rolls 120 and 122 are so mounted on the bridge 123 that they may be moved toward and away from each other. The roll 120 is loosely mounted on a shaft 128 and is held between collars 130 fixed to the shaft. The ends of the shaft 128 are secured in the lower ends of movable bracket members 132, 134 which are vertically slidably mounted on the front face of the bridge and which are provided with slots 133, 135 arranged to receive a shaft 136 to which the feed roll 122 is rigidly secured. The brackets 132, 134 are normally held in their upper position by means of compression springs 138 carried by the brackets above the shaft 136 bearing against pins 140 which engage the shaft 136.

The upper ends of the brackets 132 and 134 are each provided with a hole arranged to receive the pivots of a cam plate 142 which is provided with reduced end portions which bear against the lower surface of upwardly and forwardly inclined plates 144 which are rigidly secured to the bracket 123. When it is desired to depress the idler feed roll 120, the cam member 142 is moved manually in a clockwise direction, as indicated by the arrow in Fig. 4.

The feed roll 120 and the brackets 132 and 134, in which the feed roll 120 is mounted, are thus moved downwardly against the tension of the springs 138. In this position of the feed rolls 120, 122 the feeding mechanism is inoperative and, since the rolls are separated, the leading end of the paper web may be inserted therebetween. The shaft 136, on which the roll 122 is fixed, is mounted in suitable bearings 148, 150 secured to the end portions 124, 126 of the bridge member 123. The feed roll shaft 136 extends through the slots 133, 135 and holds the brackets 132 and 134 against the end portions 124, 126 of the bridge member 123. The feed roll 122, is intermittently rotated by means of mechanism which will later be described.

The forward faces of the bracket members 132, 134 are provided with laterally extended members 151, 152 which are fixed to their associated bracket members by means of screws or other suitable means. These members 150 and 152 serve as supports for an upper web guide plate 154 which is secured to the under side of these members by screws 156. The lower portion of the guide plate 154 is cut out as indicated at 158 to form a web-receiving passage. A forwardly extending portion of the plate 118 forms the lower surface of this web-receiving passage. A stationary knife blade 160 is secured to the forward faces of the members 150, 152 by screws 162, 164. It is to be noted that the idler roll 120, the guide member 154 and the stationary knife blade 160 move downwardly as a unit when it is desired to disengage the two feeding rolls 120 and 122 as above described.

As viewed in Fig. 6, the left hand end of the stationary knife blade 160 is provided with a downwardly extending portion 166 having a hole therein to receive a stud 168 which acts as a pivot for the movable knife blade 170. As illustrated herein, the knife blades 160 and 170 are normally urged toward closed position by means of a spring 172 which is connected at one end to the stationary blade 160 and at its other end to the movable knife blade 170. The other end of the movable knife blade 170 is apertured to receive a member 173 which is connected to one arm of a bell crank lever 174.

Said bell crank lever 174 is pivotally mounted in a bracket 176 fixed to the under side of the bed 40 of the machine. The other arm of the bell crank lever 174 is pivotally connected to one end of a link 178. The other end of the link 178 is slotted to receive a shaft 180 extending longitudinally of the bed 40, which is mounted in bearings 182 secured to the under side of the bed 38. The link 178 carries a cam roll 184 which is arranged to engage a cam track 186 formed in a cam 188 fixed to the shaft 180. The shaft 180 is rotated through chain and sprocket connections to the jack shaft 74. The cam track 186 is so related to the other parts of the machine that the movable knife blade 174 moves upwardly immediately after the conclusion of the feeding movement of the rolls 120 and 122 to sever an addressed label from the paper web.

It is to be noted that the feed rolls 120 and 122 feed the web between the knife blades 160, 170 and over a roller 189 rotatably mounted in a trough 190 which, as illustrated, is arranged to provide a constant level of water, if the paper web has an adhesive face, or an adhesive solution if the web has no adhesive coating. Water or other fluid is fed to the trough 190 through a tube 192 which leads to a container 194 mounted at the right hand rear corner of the machine bed 40. This container 194 is in the form of a bottle which is inverted in a dish like container 196. The construction and operation of this container is well-known and need not be further described herein except to state that by the use of this construction a substantially constant level of water or other fluid is maintained in the trough 190.

The trough 190 is provided with a cover 198 apertured to receive the moistening roll 189. The cover 198 is provided with a pair of upstanding members 200, 202 which are apertured at their upper ends to receive the reduced ends of a member or shoe 204 which is arranged to rest against the upper surface of the paper web to maintain the paper web against the moistening roll 189. This insures that the adhesive coating on the lower surface of the web is brought into contact with the wet or damp roll 189 and moistened and made sticky. It is to be noted that the trough 190 is provided with a cover 206 which covers aligned openings formed in the cover plate 198 and the bracket member 202 to permit inspection of the liquid level in the trough 190.

After the paper web passes over the moistening roll 189 and below the member 204 it passes over a ribbed supporting member 208 which may, if desired, be formed as a forward extension of the cover plate 198, or it may be formed from a separate piece of material and supported on suitable supports secured to the table or bed 38. The ribs 210, 212 on the plate 208 support moistened or dampened labels and serve to permit the forward end of the paper to be fed across the plate without sticking.

After the web is fed forwardly over the roll 189 and onto the plate 208, a suction feeding pad 214 moves rearwardly, from the position shown in Fig. 2, to engage the forward end portion of the label strip. Suction for the pad 214 is provided by a vacuum pump of usual construction which is arranged to be driven from the jack shaft 74 of the machine by a crank 218 which in turn is connected to the suction pump 216. A rubber tube 219 connects the suction pad 214 and the pump 216. This crank 218 is so positioned on the shaft 74 with respect to the other operating mechanism that the pump operates on its suction stroke only during forward movement of the suction pad 214.

As shown most clearly in Fig. 24 the suction pad 214 is cut away to provide a suction chamber 220. This chamber is closed by a perforated metal plate 221 which may be attached to the suction pad 214 by any suitable means. As illustrated herein, the perforated metal plate 221 is secured to the edges of the suction pad 214 by means of cement. It is desirable to provide a yielding surface for the suction pad 214 and, to this end, there is secured to the perforated metal plate 221 a rubber pad 222 having perforations aligned with the perforations in the plate 221. This rubber pad is preferably secured to the plate 221 by means of a suitable cement. Above the suction chamber 220, there is provided a hole 224 through which passes a rod 226. The ends of the rod 226 are secured to pivoted links 228 which in turn are loosely and pivotally connected to a bracket 232. It is apparent that the rod 226 and the links 228 assist in maintaining the suction pad 214 in substantially horizontal position during movements toward and away from label applying position.

The suction pad 214 is mounted for movement in a pair of brackets 232, 234 fixed to the bed 40 by screws or other suitable fastenings. As shown most clearly in Fig. 4, the brackets 232, 234, are each provided with cam grooves 236 which receive cam rolls 238 removably secured to the ends of the suction pad 214. The forward end of each cam track 236 is inclined downwardly toward the bed 38 to cause the suction pad 214 to press the forward end of the label into engagement with a folder or circular 30 which has been fed into an address label affixing position by mechanism which will later be described. The suction pad 214 is carried by a reciprocating yoke 240 having bearings formed in its downwardly projecting arms arranged to receive the stub shafts which support the cam rolls 238. The upper end of the yoke 240 is pivotally secured to one end of a pair of link arms 242, the other ends of which are fixed to a shaft 244 journalled in bearings formed at the upper end of a pair of upstanding brackets 246 which are screwed to the bed 38 of the machine.

Said shaft 244 has fixed thereto an arm 248 pivotally secured to one end of a link 250. The other end of the link 250 is pivotally secured to the upper end of a bent lever 252 which is fulcrumed at 254 in a bracket secured to the machine bed 38. The lower end of the lever 252 carries a cam roll 256 which fits into a cam groove formed in a cam member 258 fixed to the shaft 180 of the machine.

The cam member 258 is so arranged on the shaft 180 that the suction pad 214 moves rearwardly from the position shown in Fig. 4 at substantially the same time that the movable knife member 170 is moving upwardly to sever a label from the paper web. The suction pad 214 is then moved forwardly and downwardly to push the label strip into engagement with the top of the folder or circular 30.

Prior to the severance of the label from the web, the label section receives an address by passing through a printing position and into the action of printing mechanism thereat. As shown most clearly in Fig. 2, the machine is provided with a well-known type of inking mechanism which includes an ink reservoir 260 in the form of a hollow perforated cylinder mounted in suitable bearings at the top of a bracket 262 which is rigidly secured to the top of the bed 38. The bracket 262 is provided with forwardly extending arms 264 which are provided with bearings to receive the shaft of an ink spreading roll 266. It is to be noted at this point that the ink reservoir 260 is arranged normally to be maintained out of engagement with the ink spreading roll 266. When it is desired to apply ink to the roll 266, the operator depresses a forwardly extending arm 268 to move the roll 260 downwardly into engagement with the roll 266. As shown in Fig. 1, the roll 266 is mounted on a shaft 270 which is journalled in the aforesaid bearings in the arms 264. The shaft 270 is provided at one end with a pulley 272 which is belt driven from the pulley 274 mounted on a shaft 276 which is journalled in a bracket bearing member 278 secured to the rear edge of the bed 38. The shaft 276 carries at its other end a pulley 280 which is driven by a crossed belt from the constantly rotating shaft 290. Referring now to Fig. 2, it will be noted that a pair of ink spreading rolls 292, 294 are mounted on an oscillating member 296 which is pivotally mounted between upwardly and forwardly extending arms 264. The rolls 292 and 294 are alternately brought into engagement with the ink receiving roll 266 to cover the rolls with ink. The rolls 292, 294 are alternately brought into engagement with an inking drum 298 which is rotatably mounted in forwardly extending arms 300 of the bracket 262. The drum 298 is constantly in engagement with an ink applying roll 302. The drum 298 and the roll 302 are normally maintained in engagement by a spring 304. The ink roll 302 transfers ink carried therein to a printing roll 306 which is mounted in bearings in the forward end of an oscillating yoke 308. The above described inking mechanism is well-known in the prior art and need not be described in any greater detail herein, since its construction and operation are well known to those skilled in the art.

The printing roll 306 is moved toward and away from a stencil 46, in printing position by driving mechanism which is well known in the art. As illustrated herein, the shaft 74 is provided with means which is arranged to reciprocate an upwardly and rearwardly extending link 312 which carries at its upper end a spring 313 and a plunger 314 which is arranged to permit relative movement between the plunger 314 and the link 312 when excessive pressure is encountered. The upper end of the plunger 314 is pivotally connected to a lever 316 fixed to a shaft 318 journalled in a bracket 319 secured to and depending below the bottom surface of the bed 38. An upwardly extended cam arm 320 is fixed to said shaft 318 and is provided at its upper end with a cam surface 322 which engages a cam roll 324 rotatably carried by a printing platen 326. Thus when the link 312 is moved upwardly, the arm 320 of the bell crank lever is moved in a clock-wise direction to move the printing platen 326 upwardly and into engagement with the paper web. Said operating lever 316 is connected to a downwardly extending arm 328 of the yoke 308 by a link 330. Thus, when the link 312 moves upwardly, the yoke 308 is moved about its pivot 332 in a clock-wise direction to move the printing roll 306 downwardly to exert pressure against the stencil 46 which is supported at this time by the printing platen 326. Substantial pressure is applied to the stencil so that ink is forced through the printing characters on the stencil and onto the paper web.

As previously stated, the feed roll 122 is intermittently rotated to feed the paper web through the printing and severing devices. The roll-rotating mechanism, see Figs. 1, 2, and 14, includes an upwardly extending arm 334 which is rigidly secured to the yoke 308. The upper end of the arm 334 is provided with a screw or pin 340 which is received in a slot 342 formed in the upper portion and extended longitudinally of a link 344. The lower end of the link 344 is pivotally secured to a pawl carrying arm 346 pivoted on a shaft 348 to which a ratchet 350 is secured.

The shaft 348 is mounted in bearings formed in a bracket 352 secured to the top of the end portion 126 of the bridge member 123. The pawl arm 346 carries a pawl 354 arranged to engage the ratchet 350 to move it in a clock-wise direction, as viewed in Fig. 4. It is apparent that said movement of the paper web occurs after the printing operation and during return movement of the printing roll 306 and the platen 326. The shaft 136 carrying the feeding roll 122 is driven by the ratchet and pawl mechanism through gears 356 and 358 mounted on the shafts 348 and 136 respectively. The stroke of the pawl, and consequently the amount of feed of the paper web can be adjusted by adjusting the portion of the pin 340 in its slot. This is accomplished by an adjusting screw 341 which is screw-threaded in said link 344 and into said slot and bears against the pin, being held yieldingly thereagainst by the tension spring 345.

The machine is also provided with an adjustable article holder 360 mounted on the machine bed forwardly of the stencil holder 48. The adjustable article holder 360 is located, as shown in Fig. 1, at the right hand end of the machine and adjacent to the right hand end of a pair of parallel spaced rails 362, 364 which are secured to the bed 38 of the machine to form a longitudinally extending groove or guideway between which the articles to be addressed are moved. The rail 362 is fixed in position while the rail 364 is adjustable to accommodate articles of different widths. The article holder 360 is provided with a pair of members 366 forming a fixed rear wall for the article holder. These members are secured to the bed of the machine by screws and are located in alignment with the rail 362. The front wall of the holder 360 includes a pair of upstanding members 368 which are provided with horizontally extending portions 370 having slots 372 through which pass thumb screws 374 for adjustably securing the members 368 in position upon the bed of the machine. The holder 360 is also provided with a wall member 376 which is fixed in position above the rail 362. As illustrated, the member 376 is secured by screws or other suitable means to a bridge member 378 which in turn is secured to the bed of the machine. The lower end of the member 376 is spaced above the top of a movable pusher plate 380 a distance greater than the thickness of an article 387 to be removed from the stack. It is apparent that by so constructing the article holder 360, it may be adjusted to receive articles of varying sizes and to maintain them in vertical alignment.

The movable pusher member 380 is also adjustable to feed and support articles of different sizes. As shown most clearly in Figs. 15 and 16 the pusher 380 comprises a plate 382, fixed to a slide 384 mounted between guideways 386 secured to the bed 38 of the machine. As illustrated herein, the plate 382 is secured to the slide 384 by means of screws, but it is apparent that the plate 382 could be adjustably secured to the slide 384 if so desired. The plate 360 is provided with a longitudinally extending slot 388 for providing access to adjusting screws 390 which adjustably secure the slide 384 to a depending bracket member 392 which extends through a slot formed in the bed 38 of the machine. The forward end of the bracket 390 is provided with depending ears having bearings for receiving a pin 392 to which is pivotally connected one end of a link 394. The other end of the link 394 is pivotally connected to the upper end of an eccentric strap 396 surrounding an eccentric 398 fixed to a shaft 400. The lower end of the eccentric strap 396 is provided with a slot 402 which surrounds a pin 404 mounted in a bracket 406 which is adjustably secured by means of machine screws to the machine frame. The shaft 400 is driven from the shaft 180 by bevel gears 408, 410. The pusher 380 is, therefore, caused to reciprocate in timed relation with the other parts of the machine.

It is apparent, that by loosening screws 390, the plate 382 and the slide 384 can be moved to the right or the left relatively to the bracket 390 to accommodate articles of larger or smaller size.

The article holder 360 is also provided with a weighted hinged member 412 which is slidably connected to the vertical portion of the member 376 to bear against the top of articles in the stack so as to insure the feeding of the successive articles. As illustrated, said member 412 is provided with hooks 414 which embrace the vertical edges of the member 376. These hooks 414 may be formed as a part of a weight 416 to which is hinged a plate 412 arranged to bear against the rear edge of articles contained within the holder 360. This construction insures that the forward edge of the lowermost article 361 in the holder is brought into engagement with the supporting surface of the plate 382 and also that the rear edge of the lowermost article in the stack is engaged by a projection 420 fixed to the rear end of the plate 382 by machine screws. This projection 420 engages the rear edge of the article to move the lowermost article in the stack toward the left upon movement of the pusher 380 in that direction.

The lowermost article in the stack is moved toward the left, as above described, by the pusher 380 between a pair of feed rolls 422, 424 which rotate at a speed slightly greater than the speed of the pusher member 380 to continue the feed of the lowermost article toward label receiving position. The feed roll 422 is secured to a shaft 425 rotatably mounted in bearings formed in brackets 426 which are secured to the top of the bed 38 of the machine. The rear end of the shaft 425 is provided with a gear 428 which meshes with a gear 429 fixed to a shaft 430 to which the feed roll 424 is secured. The forward end of the shaft 430 carries a sprocket 431 which is chain driven from a sprocket 433 fixed to the shaft 468. It is to be noted that the drive between the shaft 425 and the shaft 430 is so related that the peripheral speeds of each of the feed rolls 422 and 424 is the same.

Before the article engaged by the rolls 422, 424 passes from between said rolls, it is engaged by a pair of feed rolls 432 secured to a shaft 434 which continue the feed of the article into label receiving position. The shaft 434 is journalled in suitable bearings 436, 438 secured to the top of the machine bed 40. The forward end of the shaft 434 is provided with a sprocket 440 which is chain driven from a sprocket 441 fixed to the forward end of the shaft 425. And idler roll 442 cooperates with the feed rolls 432 to feed the article into label receiving position and the roll 442 is journalled in suitable bearings 444 secured to the table or machine bed 38 between the rails 362 and 364.

The article 381 is fed toward the left by the feed rolls 432 until the leading edge of the article is brought into engagement with a stop 446. A guide or presser member 448 is mounted above the advancing article to insure that the article will be held against an anvil 450. As illustrated, the guide or presser member 448 is pivotally mounted on a bracket member 451 for movement toward and away from the anvil 450. The stop member 446 is intended to be located in the path of movement of the folder at the time the latter is moving into label affixing position and to be moved out of such position after the label has been applied. For this purpose the stop member is mounted in a swinging arm 447 for adjustment lengthwise of the line of movement of the folder to govern the location of the labels on folders of different length. Said arm is journalled in a bracket 449 fixed to the machine bed and is connected to a depending arm 453, see Fig. 5, having a cam roller 455 which rolls on the face of a cam 457 fixed to the shaft 180. The shape of said cam is such as to effect the raising and lowering of the stop member in the designed manner.

At this point in the cycle of operation of the machine, that is, when an article is in position to receive an addressed label with the forward edge of the article in engagement with the stop 446, the suction pad 214 is first moved rearwardly from the position shown in Fig. 2 to engage the addressed label, which has been severed from the web and then moves forwardly and downwardly to press the adhesive addressed label into engagement with the article 381 in label attaching position with the rear part of the label projecting beyond the edge of the article or folder. The addressed portion of the label is thus caused firmly to adhere to the upper surface of the article 381.

The shaft 452 carries a pair of feed rolls 456 which are arranged to move the article from label affixing position. Said shaft 452 is journalled in bearings formed in a bracket member 458 which is secured to the top of the machine bed 38 and the forward end of the shaft 452 is provided with a sprocket 460 for rotating the shaft 452 as will later be described. A pair of feed rolls 462 are secured to a shaft 464 which is mounted in bearings formed in a yoke or lever 466 pivotally secured at one end to a bracket 468 secured to the under surface of the machine bed 38. The shaft 464 is chain-driven from the shaft 430 by a sprocket 470. The feed wheels 462 are moved toward and away from the feed rolls 456 by a rotating cam 472 secured to a shaft 474. The shaft 474 is provided with a sprocket 476 which is chain driven by a sprocket 478 secured to one end of the shaft 400. The yoke or lever 466 carrying the feed rolls 462 is provided with a cam roll 480 which engages the cam 472 to raise and lower the feed rolls 462. As shown in Fig. 5, the feed rolls 462 are in feeding position and are arranged to move the article toward the left after an addressed label has been attached to the upper surface of the article. After the article has left the feed rolls 462 the high spot on the cam 472 passes from beneath the cam roll 480 on the lever 466 and permits the same to be lowered, thereby rendering the feed rolls 462 ineffective to feed the work.

The cooperating feed rolls 456 and 462 deliver the labeled article to another pair of feed rolls 482 which are fixed to one end of a shaft 484. A bracket member 486 is fixed to the top surface of the bed 38 of the machine and is journalled to provide bearings for the shaft 484. The shaft 484 is driven from the shaft 434 by a sprocket 488 fixed to the shaft 434 through a chain drive to a sprocket 490 fixed to the forward end of the shaft 484. A freely rotating roll 492 cooperates with the rolls 482 to feed the article. This roll 492 is rotatably mounted in bearings 494 fixed to the top surface of the bed 38 between the rails 362 and 364. The feed rolls 484 rotate at a relatively high speed and, consequently, act as kick rolls to feed the article to a pair of squeeze rolls 496 which are mounted in suitable bearings at the left hand end of the machine. As illustrated, these squeeze rolls are arranged to engage the article adjacent to the edge to which the label is applied. As shown most clearly in Fig. 18, the squeeze rolls 496 are driven from the shaft 180 by bevel gearing. A bevel or miter gear 498 is fixed to the left hand end of the shaft 180 and meshes with a bevel gear 500 fixed to a vertical shaft 502. The upper end of the shaft 502 is provided with a bevel gear 504 which meshes with a bevel gear 506 fixed to the shaft which carries the lower squeeze roll 496. The upper roll 496 is driven from the lower roll 496 by spur gears 508. These squeeze rolls 496 operate not only to squeeze the folded address label into engagement with opposite surfaces of the article but also to discharge the addressed article into a receiver 510 which is mounted at the extreme left hand end of the machine below the squeeze rolls.

After the label has been affixed to the top surface of the article adjacent to the open edge thereof, it is folded over the open edge into engagement with the lower surface of the article to seal the same. To this end, the present invention contemplates the use of a folder 512 which is arranged to engage the label and to fold it about the open edge of the article and into engagement with the lower surface of the article as it passes from the roll 462 toward the squeeze rolls 496.

As illustrated, said folder 512 is formed of sheet metal and, as shown in Figs. 19 and 20, is shaped to provide an upper substantially plane surface 514 having an upwardly inclined leading edge 516. The upwardly inclined edge 516 is provided with spaced loops 517 which are arranged to receive a rod 519 which is fixed suitably to the top surface of the bed 38. The other end of the folder 512 is fixed to a block 520 which is secured to the bed 38 of the machine. The folder 512 is provided with a portion 522 which is bent progressively downwardly and inwardly substantially into parallelism with the under surface of the frame portion 514. Just forwardly of this bent down portion 522 there is provided a notch 524 which is arranged to engage the leading end of the unattached portion of the label to cause that portion of the label to be fed into the folder and to turn that portion downwardly and inwardly against the bottom surface of the article to which the label is attached. The distance between the parallel portion 518 and the downwardly and inturned portion 522 is preferably slightly less than the normal or uncompressed thickness of the article so that light pressure is applied to the article to cause the downwardly inturned label portion to adhere securely to the under surface of the article. After the article leaves the folder 512 the squeeze rolls 496 firmly press the inturned portions of the label against the article thereby insuring that the open edge portion of the article is securely sealed.

Although the present invention has been described with particular reference to the illustrated embodiment thereof, it is to be understood that the invention is not to be limited thereto, but that changes and alterations may be made within the scope of the appended claims. For instance, instead of addressing the web as it is advanced toward the label-applying position the web may be separately addressed and the addressed web fed as herein described, in which event the addressing part of the machine need not be used.

Having thus described my invention, what I claim as new and desire to secure by the Letters Patent of the United States is:

1. In an addressing machine, mechanism for applying labels to articles, said mechanism including means for advancing a web, means for severing successive labels from the web, means for rendering a face of said labels tacky prior to the operation of the severing means, means including a suction box for carrying said tacky labels, and means for advancing said box over an article to be labelled and for pressing the tacky label by means of said box onto the article.

2. In an addressing machine, mechanism for applying labels to articles including means for advancing a label strip, means for severing successive labels from the strip, means for rendering a face of said label adhesive, a support for the adhesive label, a suction box reciprocable between said support and a label applying position for transporting the labels from said support to an article in said label applying position, and means for applying pressure to said suction box to press the label onto the article.

3. In an addressing machine, label applying mechanism comprising a conditioning roll for rendering a face of the label adhesive, label transporting mechanism located on one side of said roll, label severing mechanism located on the other side of said roll, and means for moving said label transporting mechanism away from said roll when in engagement with the label to move at least a part of said label over and in engagement with said conditioning roll.

4. In an addressing machine, mechanism for applying labels to a succession of articles positioned in a label applying position, said mechanism including feed rolls operative to advance a label web toward label applying position, means including a conditioning roller operative to render a face of the label adhesive, means located between said conditioning roll and said feed rolls for severing labels from said strip when a part of the label projects forwardly of said conditioning roll, and label transporting means reciprocable between said conditioning roll and said label applying position operative to engage the projecting part of the label and advance it through and in engagement with said conditioning roll.

5. In an addressing machine, mechanism for applying a label to an article comprising a conditioning roll, means for advancing a label web to the action of said roll, means located in the rear of said roll for severing a label from the web, and means including a suction box located forwardly of said roll in position to engage the leading edge of the label and to draw the label over and in engagement with said roll to render a face of the label adhesive and to apply said label to an article.

6. In an addressing and sealing machine, label moistening means, means for advancing into the label moistening means a label strip having on one face thereof a succession of addresses, means on one side of said moistening means and acting on a dry part of the strip for severing successive address bearing labels from the end of the strip, and means on the other side of said moistening means operative to engage the successive labels in the moistening means and apply them to successive articles.

7. In an addressing and sealing machine, label moistening means, means for advancing into the label moistening means a label strip having on one face thereof a succession of addresses, means on one side of said moistening means and acting on a dry part of the strip for severing successive address bearing labels from the end of the strip, and means including a suction box located on the other side of said moistening means operative to engage the dry face of a label in said moistening means, and mechanism for moving said suction box and the label carried thereby into pressure engagement with an article.

8. In an addressing and sealing machine, means for advancing successive articles to be addressed and sealed, label moistening means including a moistening roll, means for advancing a label strip having a succession of addresses thereon into said labelling means and over and in contact with said moistening roll with the end of said strip projecting from one side of said roll, means on the other side of said roll operative to engage the dry part of the strip and successively sever address labels from the end of the strip, a suction box located on the side of said roll opposite said severing means operative to engage the dry projecting face of the label on said moistening roll, and means to move said suction box away from said roll and thereby pull the dry trailing edge of said label over said moistening roll to moisten the label and to transfer the moistened label into engagement with an article.

HARMON P. ELLIOTT.